(12) United States Patent
Bickerstaff et al.

(10) Patent No.: US 8,135,383 B2
(45) Date of Patent: Mar. 13, 2012

(54) INFORMATION SECURITY AND DELIVERY METHOD AND APPARATUS

(75) Inventors: Mark Andrew Bickerstaff, Carlingford (AU); Yunxin Li, Ryde (AU); Graeme Kenneth Woodward, Epping (AU)

(73) Assignee: LSI Corporation, Milpitas, CA (US)

( * ) Notice: Subject to any disclaimer, the term of this patent is extended or adjusted under 35 U.S.C. 154(b) by 857 days.

(21) Appl. No.: 11/830,399

(22) Filed: Jul. 30, 2007

(65) Prior Publication Data

US 2009/0036095 A1 Feb. 5, 2009

(51) Int. Cl.
*H04M 1/66* (2006.01)
(52) U.S. Cl. ............. 455/410; 455/411; 455/412.1; 709/227; 713/161
(58) Field of Classification Search ....... 455/410–414.3; 709/227–229; 713/155–185; 726/26–30
See application file for complete search history.

(56) References Cited

U.S. PATENT DOCUMENTS

| | | | | |
|---|---|---|---|---|
| 6,227,447 | B1 * | 5/2001 | Campisano | 235/380 |
| 6,314,439 | B1 * | 11/2001 | Bates et al. | 715/209 |
| 6,647,075 | B1 * | 11/2003 | Genrich | 375/316 |
| 6,961,840 | B2 * | 11/2005 | Fleming et al. | 711/207 |
| 7,003,558 | B2 * | 2/2006 | Agrusa et al. | 709/223 |
| 7,099,850 | B1 * | 8/2006 | Mann et al. | 705/64 |
| 7,233,929 | B1 * | 6/2007 | Lingle et al. | 705/402 |
| 7,885,870 | B2 * | 2/2011 | Nam et al. | 705/35 |
| 2001/0000709 | A1 * | 5/2001 | Takahashi et al. | 380/277 |
| 2002/0037735 | A1 * | 3/2002 | Maggenti et al. | 455/517 |
| 2002/0095389 | A1 * | 7/2002 | Gaines | 705/67 |
| 2003/0033208 | A1 * | 2/2003 | Marin et al. | 705/26 |
| 2003/0120745 | A1 * | 6/2003 | Katagishi et al. | 709/217 |
| 2003/0182232 | A1 * | 9/2003 | Zeltzer et al. | 705/51 |
| 2003/0182583 | A1 | 9/2003 | Turco | |
| 2003/0187925 | A1 * | 10/2003 | Inala et al. | 709/204 |
| 2004/0030935 | A1 * | 2/2004 | Kai | 713/202 |
| 2004/0078334 | A1 | 4/2004 | Malcolm et al. | |
| 2004/0203768 | A1 * | 10/2004 | Ylitalo et al. | 455/435.1 |
| 2005/0140675 | A1 | 6/2005 | Billingsley et al. | |
| 2005/0203753 | A1 | 9/2005 | Kamat et al. | |
| 2006/0026438 | A1 * | 2/2006 | Stern et al. | 713/184 |
| 2006/0047725 | A1 * | 3/2006 | Bramson | 707/204 |
| 2007/0001804 | A1 * | 1/2007 | Lanier et al. | 340/5.54 |
| 2007/0192245 | A1 | 8/2007 | Fisher et al. | |
| 2008/0086632 | A1 * | 4/2008 | Kagle | 713/150 |
| 2008/0097914 | A1 | 4/2008 | Dicks et al. | |
| 2008/0162348 | A1 | 7/2008 | Lee et al. | |

FOREIGN PATENT DOCUMENTS

WO WO 0068866 A1 * 11/2000

* cited by examiner

*Primary Examiner* — Kamran Afshar
*Assistant Examiner* — Marisol Fahnert
(74) *Attorney, Agent, or Firm* — Mendelsohn, Drucker & Associates, P.C.; David L. Cargille; Steve Mendelsohn (57) ABSTRACT

A method includes storing at least one user datum received from a user in a secure storage portion of a memory within a mobile communication device. Authentication information is received into the mobile communication device. The at least one user datum is transmitted from the mobile communication device to a recipient in response to entry of the authentication information, while preventing the user of the mobile communication device from reading the at least one user datum.

21 Claims, 8 Drawing Sheets

INFORMATION SECURITY AND DELIVERY METHOD AND APPARATUS

FIELD OF THE INVENTION

The present invention relates to data security methods and apparatus for mobile devices.

BACKGROUND

It has become common for mobile terminals such as cell phones, palmtop computers and laptop computers to browse the Internet and conduct e-commerce transactions such as on-line purchasing, on-line share trading, and the like. These applications inevitably require the user to enter sensitive personal information into the mobile terminal. However, the small form factor of hand-held mobile terminals and the fact that the user may use the mobile terminal while in motion limit the data-entry possibilities. For example, unless one can memorize his/her credit card number and expiration date, the user experience of holding the credit card in one hand and entering numbers into a wireless telephone with the other hand is unfavorable.

One method sought to improve the data-entry experience itself. For example, instead of using keypad or stylus, the user was enabled to read the personal information into the mobile terminal, and a speech recognition program in the terminal recognized the information. Even though the data-entry experience had been improved, the user still has to remember the personal information (such as the credit card number) to complete the transactions. This becomes difficult as more and more personal information is to be remembered.

In another method, some application software such as a web browser may give the user the option of saving the user name and/or password (such as cookies) to a website. Subsequently, when the user browsed the same website, he/she could re-use the saved user name and/or password without re-entering the data.

Even with cookies, the user still had to remember the personal information to be input, such as the number of the credit card used to complete the transactions, at least for the first transaction with a given website. This became difficult as the user needed to remember more and more personal information.

In such a system, often the software/system/application designer, rather than the user, decided what kind of information could be saved. In some web sites, the web browser may have allowed the user to save a user name and/or password to a particular website, but did not allow the user to save the credit card information, and vise versa. Also, the software/system/application designer, rather than the user, often decides when/where/how the saved personal information (such as the password) could be used. For example, a website may have offered to save a user's credit card number and the next time the user logged onto the same website may have allowed the user to re-use the saved information without re-entering it. However, if the user browsed another website, he/she had to re-enter the credit card information again.

Another issue in the prior art is the lack of security. Mobile terminals such as mobile phones are more likely to be lost or stolen than desktop computers, which are normally secured by locked buildings. One security flaw is that anyone stealing the mobile terminal embedded with cookies or the like stored therein could readily log into the website for which the user name and password had been saved, as the terminal typically did not require the user to enter the user name and password again. Another security flaw is that such systems typically saved the personal information into a file in the file system. The file could become available to anyone who had access to the mobile terminals. In fact some experts are recommending that users should not accept cookies even in the more secure desktop environment, especially when the computer might potentially be shared by more than one user.

Another method included the use of personal identification number(s) (PIN/PIN2) on a GSM mobile phone. In these systems, PIN/PIN 2 is used to limit access to the phone by (un)locking the SIM card or keypad. However, PIN/PIN 2 cannot be used to save other personal information for later use in e-commerce etc, nor can be used to secure the contents in the phone. Unfortunately when a phone is stolen/lost, in most cases, the phone is already unlocked by the original owner. The PIN/PIN 2 is not 'personal' either, as it can be changed/reset by the operator.

Improved methods and apparatus are desired.

SUMMARY OF THE INVENTION

In some embodiments, a method comprises storing at least one user datum received from a user in a secure storage portion of a memory within a mobile communication device. Authentication information is received into the mobile communication device. The at least one user datum is transmitted from the mobile communication device to a recipient in response to entry of the authentication information, while preventing the user of the mobile communication device from reading the at least one user datum.

In some embodiments, a mobile communication device comprises a secure storage portion of a memory within the mobile communication device, for storing at least one user datum received from a user. A processor is included for executing computer program instructions for preventing the mobile communication device from outputting the user datum to the user. An interface module is included for receiving an authentication from the user. A wireless transmitter is included for transmitting signals representing the at least one user datum from the secure storage portion of the memory to a recipient in response to receipt of the authentication.

DETAILED DESCRIPTION

This description of the exemplary embodiments is intended to be read in connection with the accompanying drawings, which are to be considered part of the entire written description.

As used herein, the term, "mobile terminal" refers to any mobile communications device, such as, but not limited to, wireless telephones, cordless telephones, palmtop computers, personal digital assistants, laptop computers, or the like.

Figure 1:
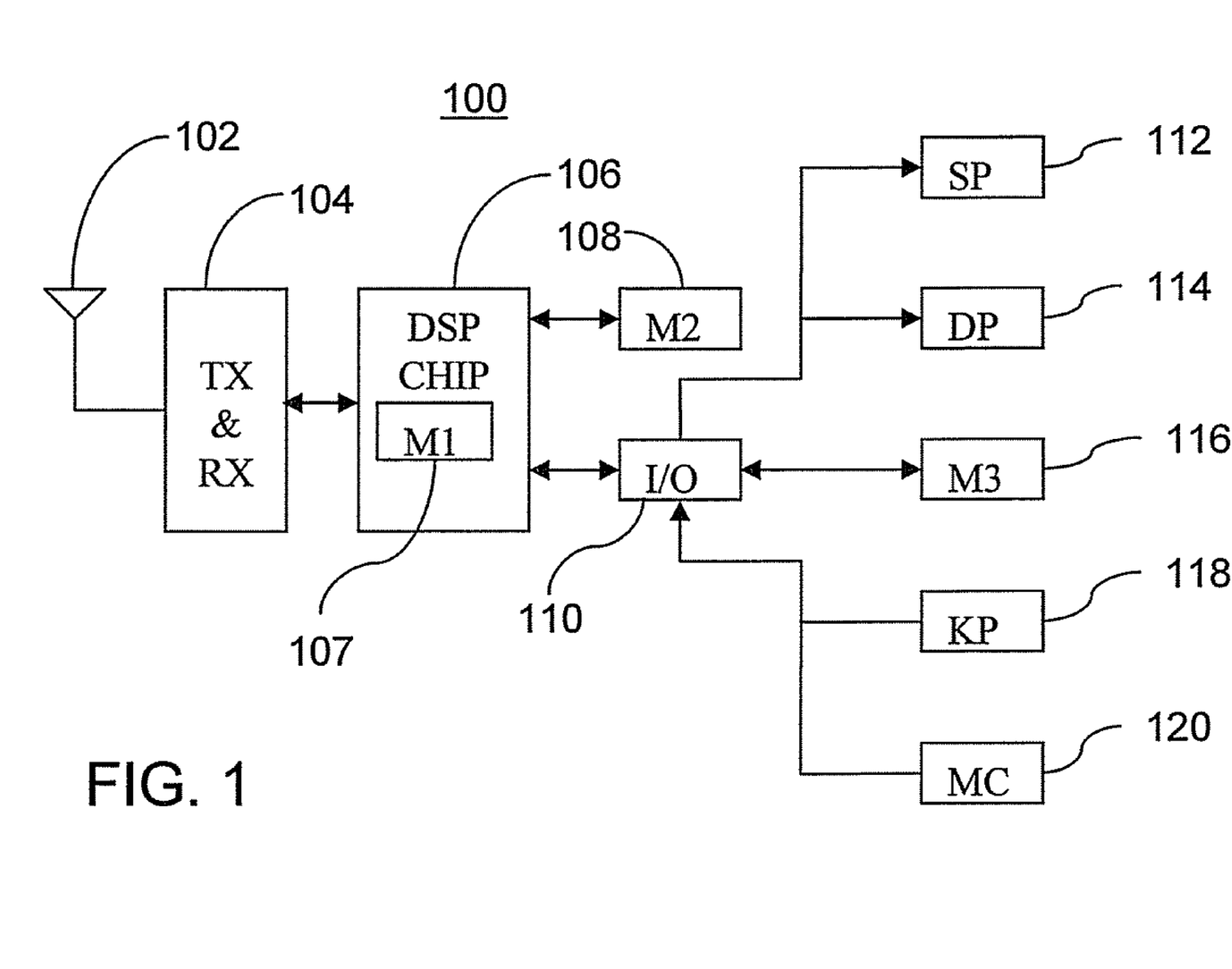
FIG. 1 is a block diagram of an exemplary mobile communication device.

FIG. 1 is a block diagram of an exemplary mobile terminal 100. The exemplary mobile terminal 100 has an antenna 102, at least one TX and one RX module 104, a digital signal processor (DSP) 106 and one or more blocks of storage or memory labeled as M1 107, M2 108, and M3 116. As used herein, the term "DSP" means any computer processor or application specific integrated circuit (ASIC), and is not limited to communication signal processing. M1 107 is embedded within DSP 106. The I/O for M1 107 is completely controlled by the logic of DSP 106, so that there is no direct external interface to M1 107. The only way that data can be written or read from memory 107 is via the DSP core, and the DSP 106 adheres to a strict security protocol preventing non-secure access to the contents of M1 107. Hence, the M1 block 107 is shown diagrammatically as embedded within the DSP 107, without direct interface that other functions external to the DSP 106 can access. Memories 108 and 116 may be any suitable storage device. For example, M2 108 may be on-board flash memory, and memory M3 116 may be a separate memory device.

The exemplary mobile terminal 100 also includes an I/O interface 110 which connects to input and output components. Typical input and output components for a telephone or palmtop device may include speaker (SP) 112, display (DP) 114, keypad (KP) 118, microphone (MC) 120 and optionally others such as a stylus or touchpad (not shown). If the mobile terminal is a laptop computer, other components, such as a variety of peripheral devices, may be connected to the computer.

DSP 106 has at least one program and one database, preferably implemented in ASIC. The program can be activated by the user or automatically started at power-up. The program may be run as a background or foreground process. The program can also be deactivated by the user at any time. The program may be implemented as a stand-alone application or as a part of another application program such as a web browser. The program may be physically stored, preferably, in M1 107 and protected from being read out of the DSP 106 in the same manner that the user personal data is protected from being read from M1.

When the user chooses to set up the alias name system, a database is created. The database includes at least one file to save the list of alias names. This alias list does not include the mapping between the aliases and the user's personal data. Therefore, this alias name file can be saved in M1 107, M2 108 or M3 116, and may be stored with or without encryption. The list of alias names (without the mapping to the user personal data) is available for use by the user interface, as described below in the description of FIG. 6.

The database also includes at least one alias PIN, which is saved in M1 107 and from which the DSP 106 does not provide read access by any external requestor. The database includes at least one file or memory portion, which saves the mappings between the alias names and the respective items of information represented by each alias. This file or memory portion is also preferably saved in M1 107, and DSP 106 does not permit read access by any external requester. Optionally, this file or memory portion may also be encrypted using the alias PIN(s) and saved in a secure section of M2, with its access being restricted to the program in DSP 106. Other programs running on the mobile terminal 100 are denied access to this file or memory portion.

When the program is active, it constantly monitors the data exchange between the DSP 106 and the TX 104 and scans the user input data. Whenever the user input data includes one of the alias names, the program authenticates the user by requiring the user to enter the alias PIN(s). If the authentication is successful, the program replaces the alias name by the personal user information that the alias represents, before passing the substituted personal user information to the TX 104. The authentication can be done for one or more alias names. Optionally, a timer may be set, and the user may be permitted to perform other transactions requiring the user personal information stored in M1 without re-entering the PIN, so that no new authentication is required before the timer expires.

Figure 2:
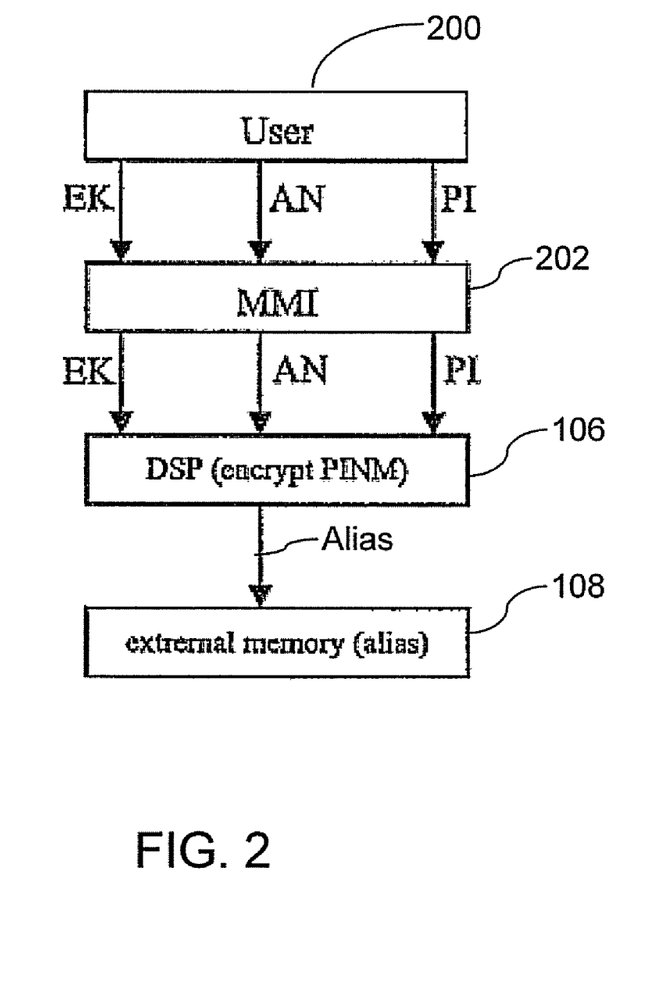
FIG. 2 is a data flow diagram of a method of storing personal information in the device of FIG. 1.

Also described herein is a man-machine interface (MMI) 202 suitable for use in mobile devices such as mobile phones, pagers, PDAs and pocket PCs. MMI 202 provides a method and apparatus to securely enter and store data into the mobile device 100 and securely use the stored data for transactions between the mobile device 100 and networks accessible by the mobile device.

One of the examples described herein is a mobile phone that:

(1) has protected internal non-volatile memory (M1) embedded in base-band/Digital Signal Processing (DSP) chip 106 solely for saving user personal information, (2) provides an Man-Machine Interface (MMI) 202 for the user to enter personal information into the M1, (3) provides a security mechanism so that the data in memory M1 107 cannot be abused if the mobile terminal falls into the wrong hands, and (4) provides an MMI 202 for the user to select an item or items of information from the memory M1, instead of having to enter the complete information at run-time.

The exemplary mobile phone 100 embeds protected internal non-volatile memory (M1) inside base-band/Digital Signal Processing (DSP) chip 106 for saving sensitive personal information. Once information is written into the M1, DSP 106 does not permit external requestors to read the sensitive information out of the DSP 106. When the user performs a transaction for which the terminal 100 is to send an item (or items) of data in the M1 over to the network, the DSP 106 internally modulates the data before the modulated signal are released out of the DSP 106, typically as modulated in-phase and quadrature (I-Q) signals.

The DSP 106 will always disallow alias substitution, if the content is to be saved locally. The DSP 106 only outputs the personal user information in M1 107 to the TX/RX chip 104, and specifically does not output that information to I/O 10, SP 112, DP 114, M3, 116, or M2 108.

FIG. 2 is a data flow diagram showing the data flows for storing the user's personal information in M1 107. The data entry (eg creation of the alias) can be done via any available user interface method, including keypad, speech recognition and handwriting recognition.

The user 200 provides three pieces of information to MMI 202 to perform the storage. These include: the personal information (PI) itself, the alias name (AN), and the user's encryption key (EK).

MMI 202 receives PI, AN and EK from the user, and passes these data to the DSP 106.

DSP 106 preferably encrypts PI, using the user-provided EK, and stores the encrypted PI in M1 107 (shown in FIG. 1). DSP 106 creates a database entry associating the PI with AN, and stores the entry in M1 107. DSP 106 also forwards AN to an external memory, such as M2 108 or M3 116.

Figure 4:
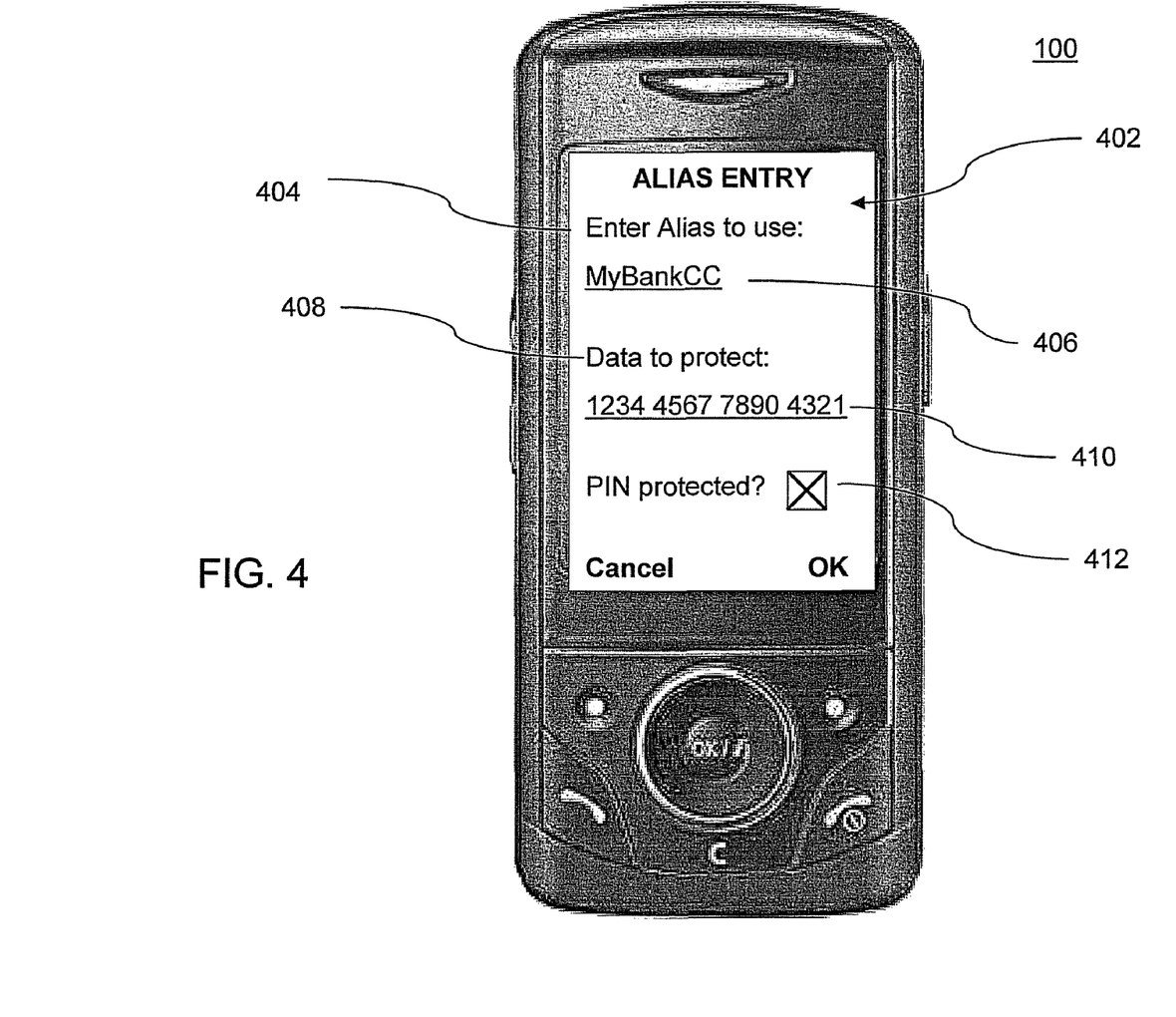
FIGS. 4-9 show exemplary screen displays for a user interface in an embodiment of the mobile device of FIG. 1.

FIG. 4 is a diagram of a mobile telephone 100 with an exemplary display screen 402 for entering an item of personal user information and the corresponding alias name. Note that this screen is stored in, and generated by, the mobile phone 100 and can be used offline, while the user is not browsing the network (e.g., Internet). A prompt 404 is provided, prompting the user to enter the user-defined alias name into field 406 using the keypad 118 (FIG. 1). Another prompt 408 is provided, prompting the user to enter the item of personal information in the field 410. A checkbox 412 is provided, to allow the user to specify PIN protection for the item.

Once entered, as shown in FIG. 4, the alias name file is available to the MMI 204, and can be presented to the user via MMI 204. Nevertheless, the corresponding user personal information PI in M1 107 is never available for the user to read again once it has been entered. For example, the user can assign the alias name for his/her credit card number as "Corgi," which would later be presented to the user rather the actual digits.

Figure 3:
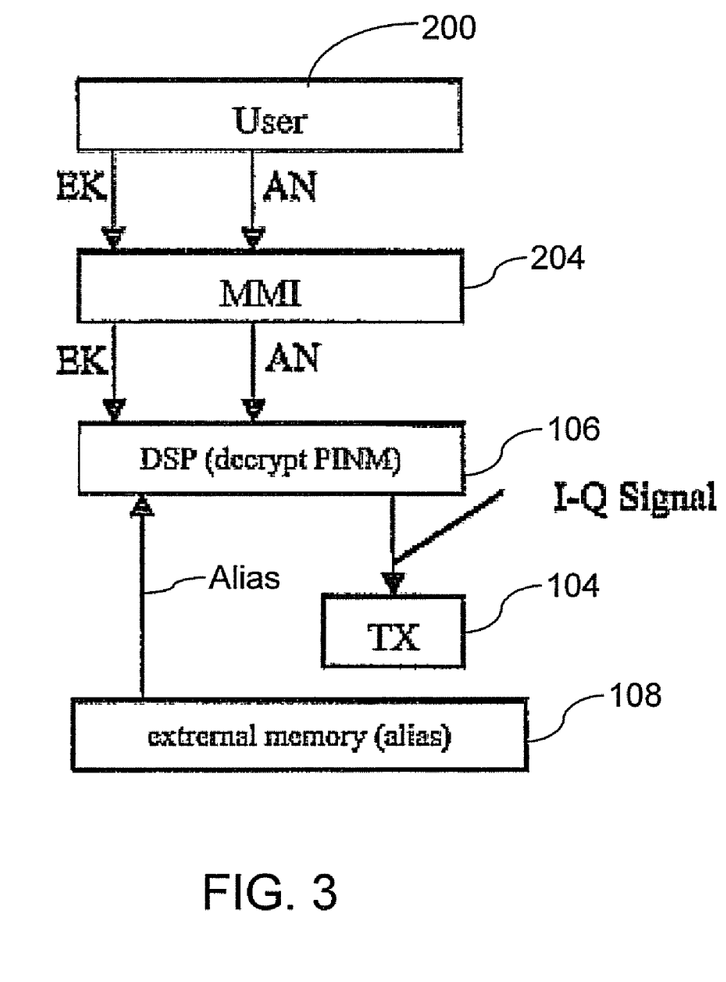
FIG. 3 is a data flow diagram of a method of transmitting personal information from the device of FIG. 1.

FIG. 3 is a data flow diagram of a method of authentication and transmitting the user personal data stored in the M1 to a recipient over the network. As shown in FIG. 3, in some embodiments, another MMI feature 204 is provided on the mobile terminal 100, which allows the user to select from a list of personal information saved in the M1 to be transmitted to the network. MMI feature 202 and MMI feature 204 are identified as separate items in FIGS. 2 and 3, indicating that they are separate procedures executed at separate times by the user. Nevertheless, they are perceived by the user as parts of a unified user interface for the mobile terminal.

The user 200 enters the alias name AN and encryption key EK into the MMI 204 to perform the authentication.

MMI 204 passes the encryption key EK and alias name AN to DSP 106.

DSP 106 uses the alias name to determine which piece of personal information PI is to be transmitted to TX 104 and antenna 102. DSP 106 finds the entry in its alias database (e.g., database stored in M1 107 or M2 108) corresponding to the input alias name AN, and determines which PI item in M1 corresponds to that alias name. DSP 106 then uses the input encryption key EK to decrypt the PI in M1 107. The decrypted item PI is then modulated (e.g., as I-Q signals) and transmitted to TX module 104.

FIGS. 5-9 show an exemplary MMI 204 for entering a previously assigned alias name in order to transmit a previously stored item PI of personal information from the mobile phone 100 without displaying the item PI to the user.

Figure 5:
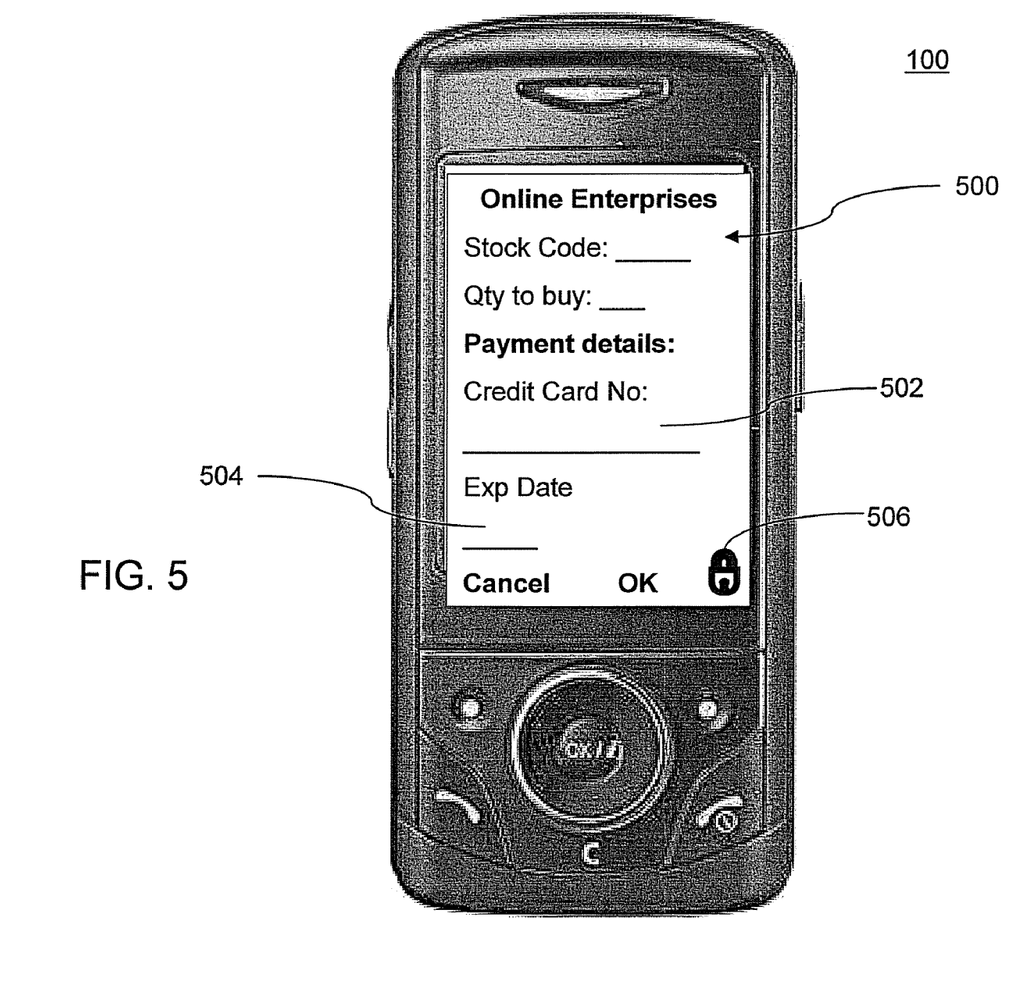

FIG. 5 is an example of a data input form 500 that may be presented to the user by an application (e.g., a Worldwide Web application). In this example, the data input form 500 requests information for making an online purchase, including a stock code for an item, a quantity to be purchased, a credit card number 502 and an expiration date 504. A padlock icon 506 indicates that the form is a secure form (i.e., using secure socket layer encryption, or SSL). Some secure fields, such as card number 502 and expiration date 504 can optionally be filled in using the alias capability of this user interface 204. When cursor is on the appropriate field (e.g., credit card No. field 502) the user can activate the alias menu, using a button that is assigned to this function. This is transparent to the Web application, so that the same input form 500 can be used to enter the credit card number manually, or by entering the alias.

Figure 6:
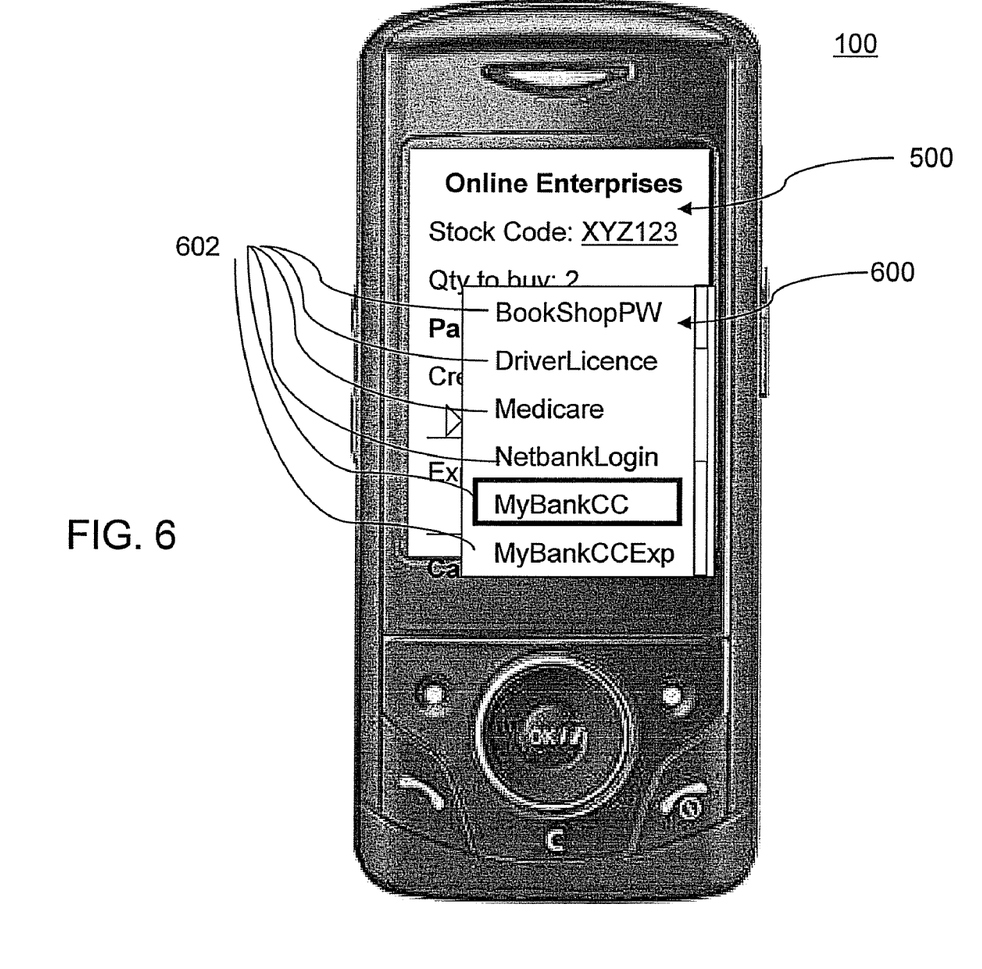

FIG. 6 shows an alias name list 600 that pops up when the assigned button is pushed while the cursor is in credit card No. field 502. Pop up menu 600 could take the form of a scrolling window on the display, for example. Menu 600 lists all of the alias names 602 stored in M1 107. In FIG. 6, the user 200 is selecting the alias "MyBankCC" associated with his/her credit card number, as shown by the highlight around that name. In a similar manner, the user 200 can move the cursor to the expiration date filed 504, push the assigned button to display the alias popup menu 600, and select the alias, "MyBankCCExp" associated with the expiration date of the credit card that has the number associated with the alias "MyBankCC."

Figure 7:
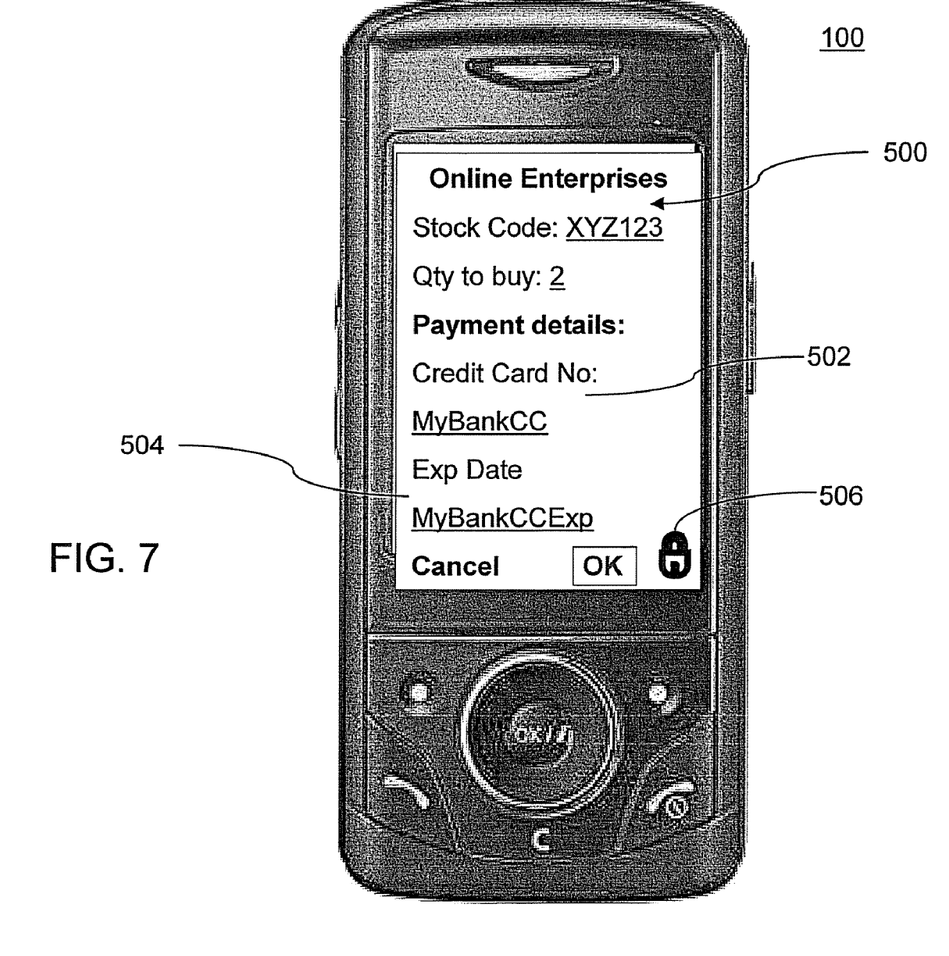

FIG. 7 shows the input form as it appears when filled in by the user 200. The alias, "MyBankCC," is displayed in the credit card No. field 502, and the alias, "MyBankCCExp," is displayed in the expiration date field 504.

Figure 8:
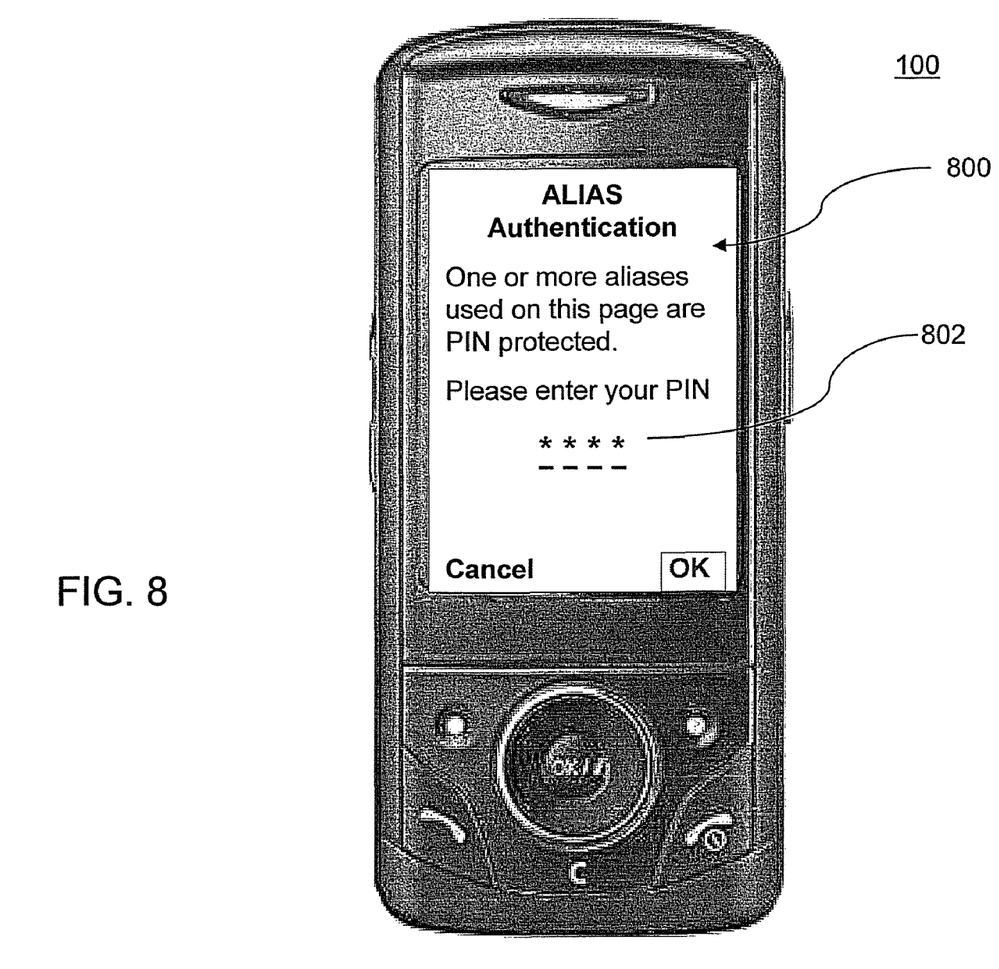

FIG. 8 is an alias authentication screen generated by MMI 204 when an alias name AN has been selected as shown in FIGS. 6 and 7. In some embodiments, the user enters a PIN. In other embodiments, the user enters the encryption key EK that was used to encrypt the information PI prior to storing PI in M1 107.

The selected alias name(s) is (are) used as place holders on the display of MMI layer 204 to replace the personal information PI, which the user would otherwise enter manually. The DSP 106 uses the alias name AN and encryption key EK from MMI layer to decrypt the data PI in the M1 107, replace the place holders by the decrypted data and transmit the data to the network, without passing the decrypted data back to the MMI 204 for display. In other words, even the authenticated user cannot read out his/her personal information PI via MMI operations.

Figure 9:
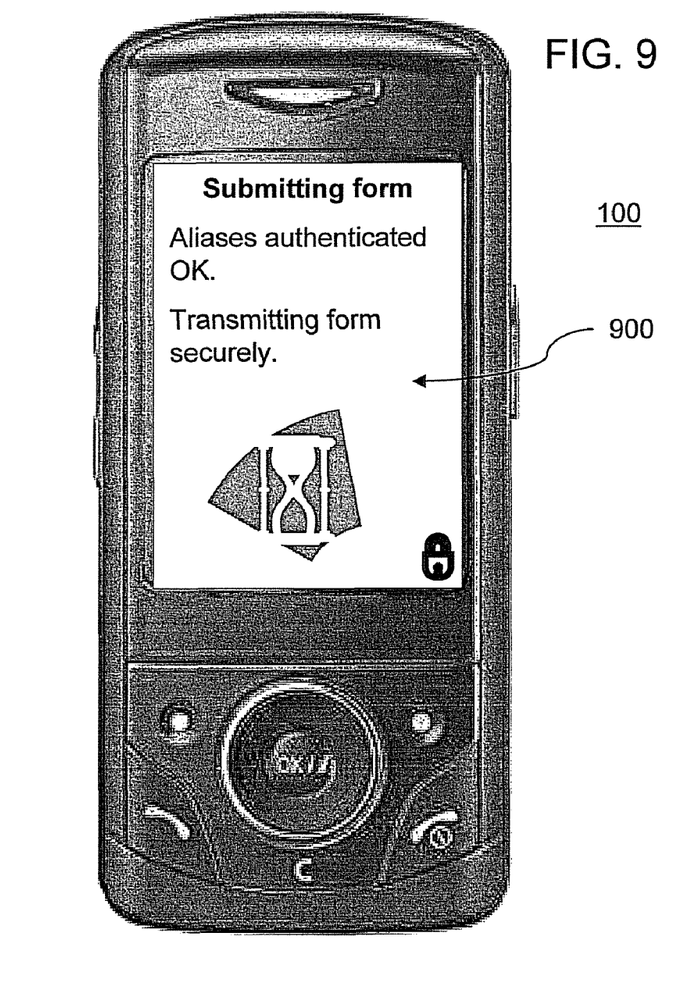

FIG. 9 is an acknowledgement screen generated by the MMI 204, indicating that the alias is authenticated, and the personal information PI is being transmitted securely by mobile phone 100. Following this screen, the Web application may optionally display an acknowledgement screen indicating that the data have been received. (This is a function of the Web application, and is not required by the MMI 204.)

Because the above described alias interface operates using the same Web application interface screens as are used without the alias option, the user 200 can choose whether to input the alias or manually enter the personal information PI, even when the information is stored in M1 107 and available.

The user, rather than software/system/application designer, also decides when/where/how the saved personal information such as password is used. In some embodiments, the user is provided with setup options to control when an alias can be used. Some examples would be:

An alias is not allowed on emails or messaging applications

An alias is not allowed to be included in any form of attachment

The scope of an alias can be restricted to only secure web forms (i.e. when the 'padlock' is active in the browser). In that way, the data is secure all the way from the handset DSP through to the web server application.

(iv) The data is physically saved inside the DSP 106, rather than in the file system, and will never be cached or read-out of the chip except as modulated (I-Q) signals, which are already encrypted in most cellular protocols.

Using the secure personal information storage and alias interface described above, the user 200 does not need to remember various kinds of personal information.

Although the user enters his/her encryption key and/or PIN, this one key can be used for all the items of personal information stored in M1 107, which can relieve the user from memorizing and keying in many items of personal information. In some embodiments, the system may only require the user to re-enter the encryption key after predefined IDLE time. In other embodiments, the authentication may be performed using biometrics such as a fingerprint scan, instead of a PIN.

In some embodiments, the items of personal information are automatically deleted from M1 107 if the encryption key is entered incorrectly for a predetermined number of times.

In some embodiments, the items of personal information are automatically deleted from M1 107 when they have been stored in M1 for a predetermined period of time. In some embodiments, at the time the user enters the PI into M1, the user is prompted for a retention period or deletion date, when the item is automatically deleted. In some embodiments, items are deleted from M1 automatically, if they have not been used for a predetermined retention period.

It will be readily apparent to one of ordinary skill in the art that a variety of embodiments may be made and used according to the principles outlined above.

In some embodiments, a method and apparatus are provided to allow the user of a mobile device to enter an alias name for each item of information that is to be saved in the phone for later usage.

In some embodiments, a method and apparatus are provided to the user of the mobile devices for him/her to enter one or more alias PINs for all items of information that have been saved with respective alias names.

In some embodiments, a method and apparatus are provided to the user of the mobile devices allowing him/her to retrieve a list of alias names from the mobile device and select an alias name instead of entering the represented information by the alias name.

In some embodiments, a method and apparatus are provided to prompt the user of the mobile devices for him/her to enter one or more alias PINs, which triggers a sequence of processing within the mobile device to replace the selected alias names by the corresponding represented information. Optionally part or all of the alias names and their represented information may be deleted after a set number of wrong input of the PIN(s).

In some embodiments, a method and apparatus are provided to save the alias names in at least one file (protected or unprotected) in the mobile device.

In some embodiments, a method and apparatus are provided to save the mappings between the alias names and their represented information in at least one protected file in the memory of the mobile device, encrypted by at least one or more alias PINs.

In some embodiments, a method and apparatus are provided to save the mappings between the alias names and their represented information inside the processing chip in the mobile device, optionally encrypted, and protected by at least one or more alias PINs and prevent the information being read out as file(s).

In some embodiments, a method and apparatus are provided to prevent the information represented by the alias names from being read out of the device in any format or displayed on the device. By doing so even the authenticated user with the knowledge of the alias PIN(s) cannot retrieve the information represented by the alias names.

In some embodiments, a method and apparatus are provided to edit (such as adding new item(s), deleting or modifying existing item(s)) the list of the alias names and their mappings to the information without retrieving the previously saved information and to change the alias PIN(s). For example, the system can display an edit screen with a field for an alias name corresponding to an item of personal information to be edited. The user can either enter the alias name manually or press a button that launches a popup menu of the current alias names. The user is then prompted to enter the new personal information, which overwrites the existing entry in M1.

In some embodiments, a method and apparatus are provided so that multiple users can share the same mobile device and each user can set up an independent list of personal alias names and alias PIN(s) to protect their personal information. Similarly a single user can set up multiple and independent lists of personal alias names and alias PIN(s) for different set of information.

In some embodiments, a method and apparatus are provided to combine the alias PIN(s) with biometric parameters to further increase the security. The biometric parameters may include finger print recognition, face recognition by image processing, voice recognition by speech processing, or retinal scan.

In some embodiments, a method and apparatus are provided to enable different levels of protection of the information represented by the alias names. For example, to send the most sensitive information from the device to the connected network, the user has to be correctly authenticated by alias PIN(s) and biometric parameters and, for less sensitive information just by either alias PIN(s) or biometric parameters and yet for the least sensitive information no authentication shall be performed.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of securing at least one user datum in a mobile communication device having a user interface, the method comprising:
   the mobile communication device receiving the at least one user datum directly from a user via the user interface;
   storing the at least one user datum received from the user in a secure storage portion of a memory within the mobile communication device;
receiving authentication information into the mobile communication device directly via the user interface;
   transmitting the at least one user datum from the mobile communication device to a recipient in response to entry of the authentication information, while preventing the user of the mobile communication device from reading the at least one user datum;
   displaying a data entry screen of a networked application program on the mobile communication device, the data entry screen having at least one field for inputting an item of personal data; and
   receiving a signal indicating a user initiated command that the at least one user datum be transmitted to a processor executing the networked application program as the input of the item of personal data, while preventing the mobile communication device from outputting the at least one user datum to the user.

2. The method of claim 1, wherein the transmitting step includes transmitting the at least one user datum across a wireless link.

3. The method of claim 1, further comprising: storing a plurality of personal user data in the secure storage portion, the at least one user datum being one of the personal user data; and receiving from the user a respective alias associated with each respective one of the personal user data; wherein the step of receiving authentication information comprises: displaying each of the aliases; and receiving a signal indicating a user selection of the user datum, as the one of the personal user data to be transmitted to the recipient upon receipt of the authentication, by selection of the alias associated with the user datum.

4. The method of claim 3, wherein:
   the step of receiving authentication information further includes receiving an encryption key entered by a user, and
   the user datum is only transmitted if the encryption key is entered correctly by the user.

5. The method of claim 1, further comprising:
storing a plurality of personal user data in the secure storage portion, the at least one user datum being one of the personal user data; receiving from the user a respective alias associated with each respective one of the personal user data; displaying each of the aliases; and receiving a signal from the user indicating selection of the user datum, as the one of the personal user data to be transmitted to the recipient upon receipt of the authentication information, by selection of the alias associated with the user datum.

6. The method of claim 1, wherein the mobile communication device is mobile telephone.

7. The method of claim 1, wherein the step of preventing the mobile communication device from outputting the at least one user datum to the user includes preventing output of the user datum to a display or to a storage device of the mobile communication device.

8. The method of claim 1, wherein the step of receiving the at least one user datum from the user includes encrypting the at least one user datum before storing the at least one user datum in the protected storage portion.

9. The method of claim 1, wherein the step of preventing the mobile communication device from outputting the at least one user datum to the user further includes preventing any access to the user datum except to transmit the user datum over a network in the form of modulated in-phase and quadrature signals.

10. The method of claim 1, wherein the authentication information comprises one of the group consisting of an encryption key and a biometric.

11. A mobile communication device for securing at least one user datum, the mobile communication device comprising:
a user interface capable of directly receiving (i) the at least one user datum from a user and (ii) an authentication; a secure storage portion of a memory within the mobile communication device, for storing the at least one user datum received from a user;
a processor capable of executing computer program instructions for preventing the mobile communication device from outputting the user datum to the user; and
a wireless transmitter capable of transmitting signals representing the at least one user datum from the secure storage portion of the memory to a recipient in response to receipt of the authentication,
wherein the user interface is capable of (i) displaying an alias to the user to identify the user datum without displaying a value of the user datum, and (ii) receiving a signal indicating selection of the alias associated with the datum.

12. The device of claim 11, wherein the processor is capable of encrypting the user datum using an encryption key to be received from the user via the user interface prior to storing the user datum in the secure storage portion.

13. The device of claim 11, further comprising a memory for storing an alias to be associated with the user datum.

14. The device of claim 11, wherein the secure storage portion is capable of storing a plurality of personal user data, the user datum being one of the personal user data; the device further comprises: a memory capable of storing a respective alias to be associated with each respective one of the personal user data, and a display; and the user interface is capable of causing the aliases to appear on the display, and to receive a signal indicating a selection by the user of the one of the personal user data to be transmitted to the recipient upon receipt of the authentication information, by selection of the alias associated with the user datum.

15. The method of claim 1, further comprising:
monitoring data to be exchanged between a processor within the mobile communication device and a wireless transmitter within the mobile communication device to identify an alias name associated with the at least one user datum;
upon receipt of the authentication information from the user, replacing the alias name in the data to be exchanged with the at least one user datum; and
passing the data to be exchanged including the at least one user datum to the wireless transmitter for transmission.

16. The method of claim 3, wherein displaying each of the aliases is performed after activation of a button on the mobile communication device that is assigned to an alias menu.

17. The mobile communication device of claim 11, wherein the processor is configured to perform the following steps:
monitoring data to be exchanged between the processor and the wireless transmitter to identify an alias name associated with the at least one user datum;
upon the user interface's receipt of the authentication from the user, replacing the alias name in the data to be exchanged with the at least one user datum; and passing the data to be exchanged including the at least one user datum to the wireless transmitter.

18. The mobile communication device of claim 11, wherein the processor is configured both (i) to output the at least one user datum only to the wireless transmitter and (ii) not to output the at least one user datum to a display or a storage device of the mobile communication device.

19. The mobile communication device of claim 11, wherein the user interface is configured to display the alias to the user after activation of a button on the mobile communication device that is assigned to an alias menu.

20. The mobile communication device of claim 11, wherein: the secure storage portion of the memory is embedded inside the processor, such that the memory can only be accessed through the processor; and the processor is a digital signal processor adapted to output the at least one user datum from the processor only as modulated in-phase and quadrature signals.

21. The mobile communication device of claim 20, wherein the modulated in-phase and quadrature signals are encrypted based on a cellular protocol.

* * * * *